(12) United States Patent
Pruden et al.

(10) Patent No.: US 7,252,501 B2
(45) Date of Patent: Aug. 7, 2007

(54) NOZZLE AND APPARATUS FOR INJECTION MOLDING

(75) Inventors: Trevor Pruden, Windsor (CA); Frederick G. Steil, Lake Orion, MI (US); Frank J. Eigler, Windsor (CA)

(73) Assignee: D-M-E Company, Madison Heights, MI (US)

( * ) Notice: Subject to any disclaimer, the term of this patent is extended or adjusted under 35 U.S.C. 154(b) by 175 days.

(21) Appl. No.: 11/059,277

(22) Filed: Feb. 16, 2005

(65) Prior Publication Data

US 2006/0182842 A1 Aug. 17, 2006

(51) Int. Cl.
B29C 45/20 (2006.01)

(52) U.S. Cl. .................. 425/564; 425/562; 425/566

(58) Field of Classification Search ............ 425/562, 425/564, 567, 574, 565, 566
See application file for complete search history.

(56) References Cited

U.S. PATENT DOCUMENTS

| 3,295,169 | A |   | 1/1967  | Moslo              |         |
|-----------|---|---|---------|--------------------|---------|
| 3,719,310 | A |   | 3/1973  | Hunten             |         |
| 3,934,626 | A | * | 1/1976  | Hall ............   | 141/117 |
| 3,941,540 | A |   | 3/1976  | Driscoll et al.    |         |
| 4,073,469 | A | * | 2/1978  | Kodric ...........  | 251/86  |
| 4,082,226 | A |   | 4/1978  | Appleman et al.    |         |
| 4,678,427 | A | * | 7/1987  | Fritzsche ......... | 425/562 |
| 4,822,269 | A | * | 4/1989  | Kamiyama et al. ...| 425/203 |
| 5,012,839 | A | * | 5/1991  | Rogers et al. .....| 137/341 |
| 5,225,217 | A |   | 7/1993  | Wisen et al.       |         |
| 5,229,145 | A |   | 7/1993  | Brown et al.       |         |
| 5,380,188 | A |   | 1/1995  | Ullisperger        |         |
| 5,458,843 | A |   | 10/1995 | Brown et al.       |         |
| 6,348,171 | B1|   | 2/2002  | Dewar et al.       |         |
| 6,575,731 | B1|   | 6/2003  | Olaru et al.       |         |
| 6,733,274 | B2| * | 5/2004  | Seta et al. .......| 425/589 |
| 2002/0140132 | A1 | * | 10/2002 | Seta et al. ......| 264/328.11 |

FOREIGN PATENT DOCUMENTS

| FR | 2336236 A    | 7/1977  |
| JP | 08336865 A   | 12/1996 |
| JP | 2003127186 A | 5/2003  |

* cited by examiner

Primary Examiner—Yogendra N. Gupta
Assistant Examiner—Emmanuel S. Luk
(74) Attorney, Agent, or Firm—John W. Gregg

(57) ABSTRACT

A nozzle controls flow of melt in injection molding equipment by passive actuation with opening and closing of a mold assembly. The nozzle comprises a valve pin having a pin passage therethrough movably supported within a nozzle passage and a contact arm transverse to and extending beyond the nozzle passage, the valve pin sealingly engaging the nozzle passage. Biasing means biases the valve pin to a closed position preventing passage of melt through the nozzle. The contact arm effects movement of the valve pin to an open position when closing of the mold assembly exerts a force on the contact arm to overcome the biasing means. A mold arrangement of plural mold assemblies comprises pairs of nozzles of the invention to control flow of melt through mating conduit segments between an injection unit and at least one mold assembly, the nozzles arranged and configured for seating engagement with abutment of the conduit segments.

19 Claims, 3 Drawing Sheets

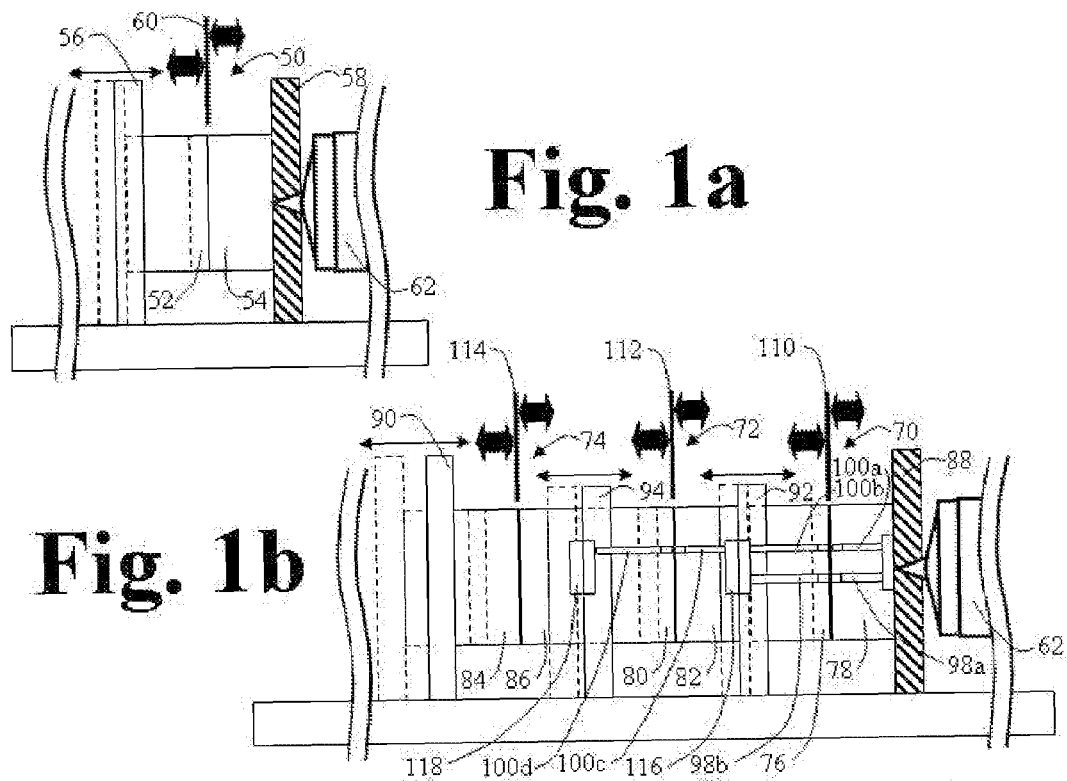
Fig. 1a
Fig. 1b
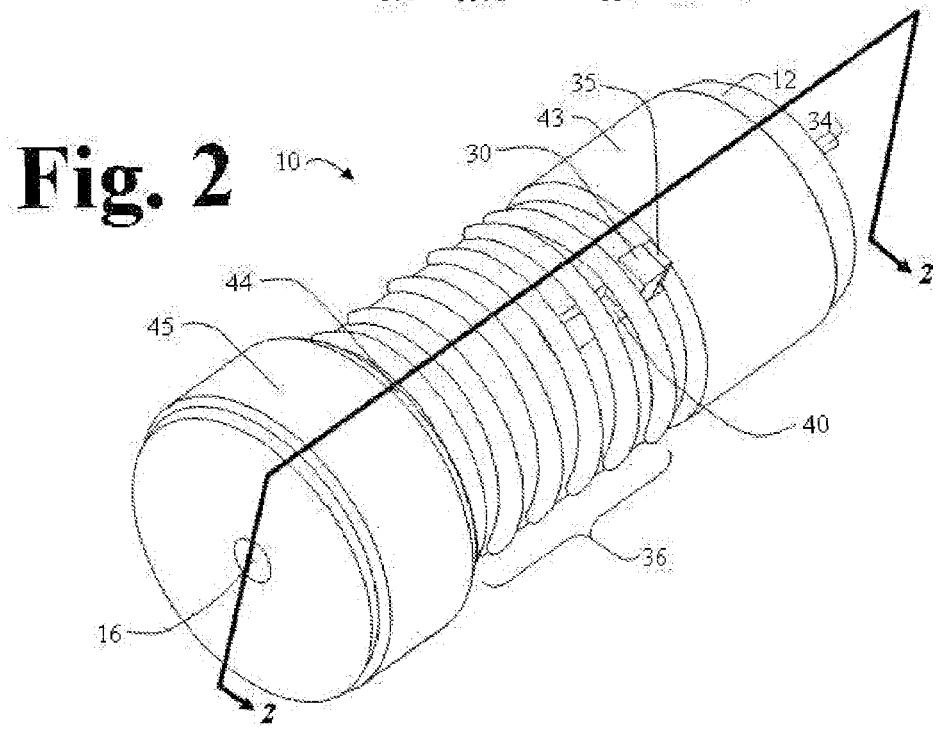
Fig. 2

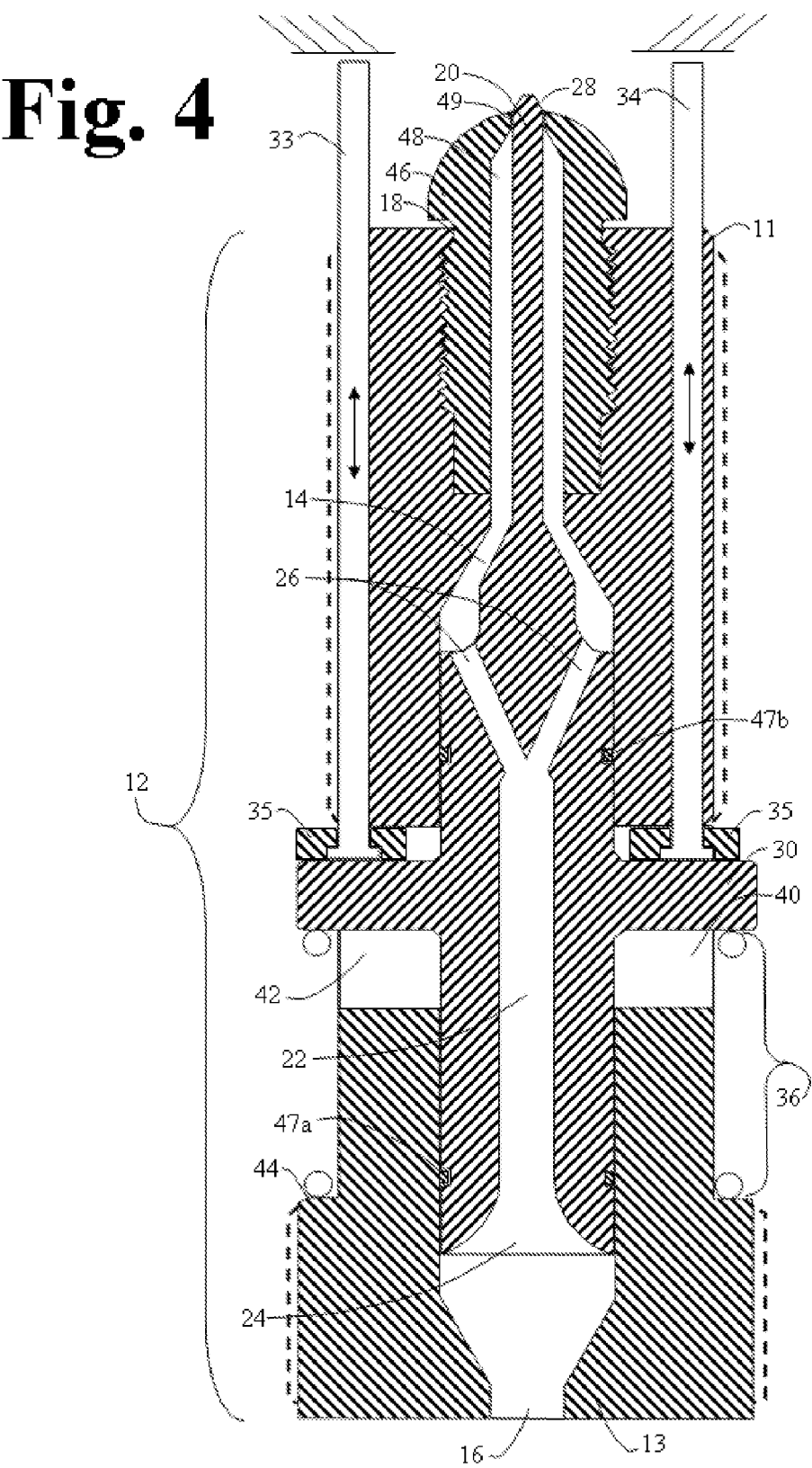

NOZZLE AND APPARATUS FOR INJECTION MOLDING

I. BACKGROUND OF THE INVENTION

1. Field of the Invention

This invention relates generally to injection molding. In particular, this invention relates to nozzles for controlling flow of melt through conduits between an injection unit and mold cavities.

2. Description of Related Art

Injection molding is a cyclic process wherein mold assemblies defining mold cavities are operable between "open" and "closed" conditions, the open condition permitting release of molded articles and the closed condition permitting filling of the cavities with material to be molded. Mold assemblies comprise mating mold components comprising a primary core component and primary cavity component, the primary core component and primary cavity component meeting along a so called "parting line" when the mold assembly is closed. The mating mold components define cavities defining the shape and size of articles to be molded. A mold assembly within the press unit of a molding machine is illustrated in FIG. 1a. Filling of cavities is effected by forcing flowable material, e.g. molten metal, rubber or thermoplastic (known as "melt"), from an injection unit through conduits to the mold cavities. Once filled, the mold assembly is held closed while the molten material solidifies and is opened to allow removal of molded articles when the material has sufficiently solidified to retain the molded form without unacceptable distortion when the material is unsupported. It is known in injection molding to provide valves for controlling flow of melt from the injection unit to the mold assembly.

It is known for each pair of mating mold components to define plural mold cavities. For such mold assemblies, it is known to provide conduits for conducting melt from the injection unit to plural nozzles, each nozzle controlling the flow of melt to one or more mold cavities. To prevent leakage of melt from the conduit on separation of the mating mold components, it is known to provide a nozzle valve for opening and closing the melt conducting passage within the nozzle. It is known to operate such valves with pneumatic or hydraulic actuators to control the opening and closing of the valves in accordance with a predetermined scheme for controlling flow of melt into the mold assembly for, for example balancing pressure among plural cavities or controlling the rate of mold filling. The complexity and cost of such nozzles makes them ill suited to applications where the valves need only be operated between a fully open condition while the mold assembly is closed and otherwise fully closed. It is also known to provide passively actuated valves with biasing means to hold the valves closed until force from admission of melt to the nozzle overcomes the biasing force and opens the valve. Such valves have the disadvantage that residual pressure in the controlled conduit after opening of a mold assembly may be sufficient to prevent full closure of the valve and hence permit leakage through the valve, known as "drooling". In light of the foregoing, there is a need for nozzle valves that are effectively fully opened and closed by passive means operated by the opening and closing of mold assemblies.

Improved productivity of injection molding is achieved by providing plural mold assemblies having plural parting lines wherein the mating mold components are carried on intermediate movable platens interposed between a stationary platen and a primary movable platen defining a press or clamping unit of the injection molding machine. Such arrangements are known as "stack molds" or "dual molds" and FIG. 1b illustrates such an arrangement for three mold assemblies in the press unit of a molding machine. In plural mold assembly arrangements, melt is conveyed from the injection unit to the mold cavities through conduits that must accommodate cyclic separation of the mold components carried by the intermediate movable platens. It is known to provide an arrangement of valves at separations of conduits in such mold arrangements to control flow through the conduits, the valves being operated by pneumatic or hydraulic actuators. The use of such actuators increases the complexity and cost of valves for controlling flow of melt through the conduits. Hence there is a need for controlling the flow of melt through conduits for mold arrangements comprising plural mold assemblies that overcome the disadvantages of the known devices.

II. SUMMARY OF THE INVENTION

It is an object of the present invention to provide a nozzle for controlling flow of melt through conduits of injection molding equipment, the passage of melt therethrough being controlled by actuation of a valve comprising the nozzle by opening and closing of a mold assembly.

It is a further object of the present invention to provide an apparatus for controlling flow of melt through a mold arrangement comprising plural mold assemblies, the passage of melt therethrough being controlled by actuation of valves comprising nozzles of the apparatus by opening and closing of mold assemblies.

Further objects and advantages of the invention shall be made apparent from the accompanying drawings and the following description thereof.

In accordance with the aforesaid objects the present invention provides a nozzle for controlling flow of melt through conduits of injection molding equipment, the nozzle comprising a nozzle body having a nozzle passage therethrough joining a nozzle inlet and a nozzle outlet, a valve pin movably supported within the nozzle passage and having a pin passage therethrough and at least one contact arm transverse to and extending beyond the nozzle passage, sealing engagement of the valve pin and nozzle passage preventing melt bypassing the valve pin through the nozzle passage, and a valve pin biasing means, the biasing means biasing the valve pin to a closed position for preventing passage of melt through the nozzle passage, the pin passage being in communication with the nozzle passage and the contact arm effecting movement of the valve pin relative to the nozzle body to an open position when forces acting on the contact arm are sufficient to overcome the biasing means, the open position enabling flow of melt through the nozzle body, the melt flowing through the pin passage between the nozzle inlet and the nozzle outlet, the nozzle being mounted in the molding equipment so that the valve pin is displaced to the open position by forces applied to the contact arm as a result of closure of the mold assembly. Further, the present invention provides an apparatus for controlling flow of melt through a mold arrangement comprising plural mold assemblies, the apparatus comprising at least one conduit for conveying melt from an injection unit to at least one mold assembly, the conduit comprising mating segments abutted with closure of the mold assemblies and separated with opening of the mold assemblies, at least one of the mating segments comprising a nozzle in accordance with the invention, the nozzles being mounted in the apparatus so that the valve pins are displaced to the open positions by forces applied to the contact arms as a result of closure of the mold assemblies whereby the open positions enable flow of melt through the nozzles.

III. BRIEF DESCRIPTION OF THE DRAWINGS

FIGS. 1a and 1b illustrate mold assemblies within press units of molding machines FIG. 2 is a three dimensional view of a nozzle in accordance with the invention.

FIG. 4 is a cross sectional view of an alternative embodiment of a nozzle in accordance with the invention.

IV. DETAILED DESCRIPTION OF THE PREFERRED EMBODIMENT

Figure 3:
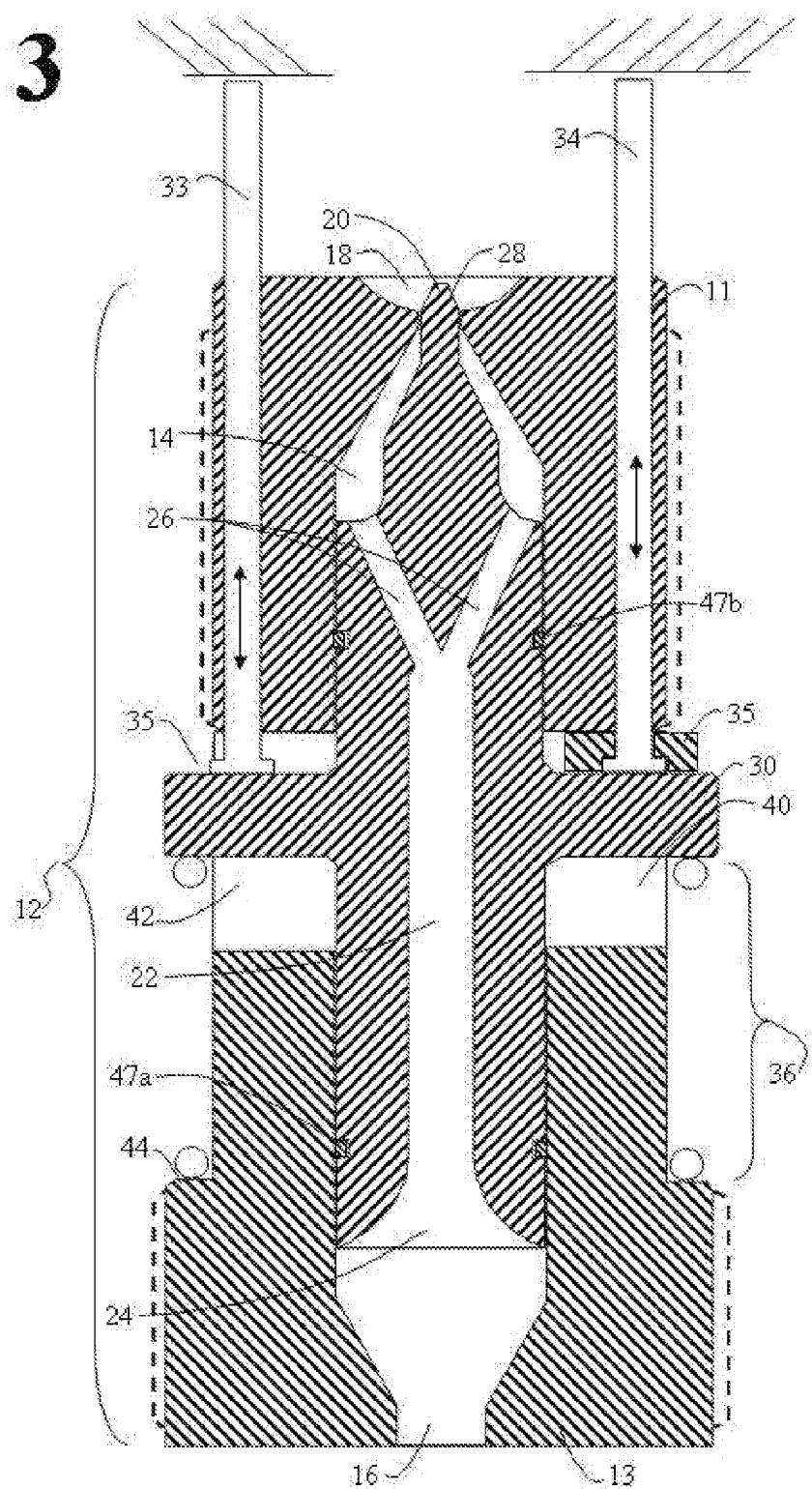
FIG. 3 is a cross sectional view of the nozzle of FIG. 2 taken along the line 2—2 of FIG. 2.

The invention shall be illustrated with reference to a preferred embodiment which shall be described in detail. It is not the intention of applicant that the invention be limited to the preferred embodiment, but rather that the invention shall be defined by the appended claims and all equivalents thereof.

Referring to FIG. 1a, a mold assembly 50 comprises a primary core component 52 and a primary cavity component 54. Primary core component 52 is supported by movable platen 56, and primary cavity component 54 is supported by stationary platen 58. Mold assembly 50 has parting line 60. Movable platen 56 and stationary platen 58 comprise a press unit of an injection molding machine. Movable platen 56 is moved to open and close mold assembly 50, an open position of movable platen 56 being shown in phantom (dashed line) in FIG. 1a. Melt is injected to mold assembly 50 from an injection unit 62, admitting melt through a passage in stationary platen 58 as illustrated by the cross-section thereof shown in FIG. 1a. Primary core component 52 and primary cavity component 54 advantageously define plural mold cavities (not shown). Distribution of melt to those cavities is advantageously effected by a configuration of conduits and nozzles (not shown in FIG. 1a) receiving melt at the passage through stationary platen 58 and conveying melt through the nozzles to the cavities. Advantageously, a nozzle in accordance with the invention may be applied to mold assembly 50 to be opened with closing of mold assembly 50 and closed with opening of mold assembly 50.

Referring to FIG. 1b, mold assemblies 70–74 have parting lines 110–114, respectively; mold assembly 70 comprises primary core component 76 and primary cavity component 78; mold assembly 72 comprises primary core component 80 and primary cavity component 82; and mold assembly 74 comprises primary core component 84 and primary cavity component 86. Movable platen 90 and stationary platen 88, together with intermediate movable platens 92 and 94 comprise a press unit of an injection molding machine. Movable platen 90, movable intermediate platen 94, and movable intermediate platen 92 are moved to open and close mold assemblies 70–74, an open position of movable platen 90 and intermediate movable platens 92 and 94 is shown in phantom (dashed line) in FIG. 1b. Primary cavity component 78 is supported by stationary platen 88, primary core component 84 is supported by movable platen 90, primary cavity component 86 and primary core component 80 are supported by intermediate movable platen 94; and primary cavity component 82 and primary core component 76 are supported by intermediate movable platen 92. Melt is injected from injection unit 62 via a passage through stationary platen 88 to mold assembly 70; via conduit pair 98a and 98b comprising conduit 98 through junction 116 to conduits comprising mold assembly 72; and via conduit pair 100a and 100b comprising conduit 100 to junction 116 and from junction 116 via conduit pair 100c and 100d comprising conduit 100 through junction 118 to conduits comprising mold assembly 74. Conduit pairs 98a and 98b, 100a and 100b, and 100c and 100d comprise so called "sprue bar" segments, the segments of each pair separating and mating with opening and closing of the mold assemblies. Although the segments are illustrated as meeting proximate the mold parting lines 110 and 112, the segments may meet anywhere along the length between the platens from which the sprue bar segments are supported. Heaters are advantageously applied to conduits 100 and 98 as well as conduits comprising intermediate platens 92 and 94 to maintain a flowable state of melt contained therein throughout a molding cycle. Notwithstanding that molding material has solidified in the mold cavities, melt remains fluid within such conduits requiring control to prevent leakage therefrom on opening of the mold assemblies. Advantageously, nozzles in accordance with the invention (not shown in FIG. 1b) can be applied to control the flow of melt from injection unit 62 to mold assemblies 70–74 as will be more fully described herein.

Referring to FIGS. 2 and 3, a nozzle 10 comprises nozzle body 12 having a nozzle passage 14 therethrough joining nozzle inlet 16 and nozzle outlet 18. Nozzle body 12 comprises forward section 11 comprising nozzle outlet 18 and base section 13 comprising nozzle inlet 16, base section 13 and forward section 11 being attached to one another by fasteners such as bolts (not shown). A valve pin 20 is movably supported within nozzle passage 14. To prevent melt bypassing valve pin 20 through nozzle passage 14, valve pin 20 and nozzle passage 14 are sealingly engaged. Advantageously, sealing engagement is effected by sealing means such as, for example, ring seals 47a and 47b located to insure seals preventing melt reaching slots 40 and 42 and exiting nozzle 10 therefrom. A pin passage 22 through valve pin 20 joins pin inlet 24 and a pin outlet such as pin ports 26. Pin inlet 24 and the pin outlet are each open to the nozzle passage. Advantageously, valve pin 20 comprises valve end 28 sized to form a seal at the neck portion comprising nozzle outlet 18. Pin ports 26 are effective to divide the flow of melt before it exits nozzle 10. This division of melt tends to equalize transverse forces acting on valve pin 20 as melt enters or exits pin passage 22 at the pin outlet. The division of flow of melt tends to disrupt laminar flow through nozzle 10, improving the homogeneity of melt passing through nozzle 10 and thereby reducing the tendency to introduce streaking in the finished article as might otherwise arise. Valve pin 20 comprises contact arm 30 transverse to and projecting beyond nozzle passage 14 through slots 40 and 42 in base section 13. Slots 40 and 42 are advantageously open at the periphery of nozzle body 12. Contact arm 30 comprises at least two contact pins, such as contact pins 33 and 34 which, with valve pin 20 at the fully closed position shown in FIG. 3, project beyond nozzle outlet 18. Contact pins 33 and 34 are mounted to contact arm 30 by retainer plates 35, each retainer plate 35 retaining the head end of a contact pin against contact arm 30 and being attached to contact arm 30 by, for example, fasteners such as screws (not shown). Heaters 43 and 45 are depicted in FIG. 2 (in phantom (dashed line) in FIG. 3) surrounding forward section 11 of nozzle body 12 and the large diameter of base section 13, respectively. Heaters are advantageously applied to nozzles in accordance with the invention to maintain melt in a flowable condition while resident within nozzle 10. Although shown as applied to the exterior of nozzle 10, internal heaters may be used, for example, so called "cartridge" heaters (not shown) for fitting within bores of components of nozzle body 12. Combinations of external and internal heaters may be applied as appropriate to the construction of nozzle 10.

While valve pin 20 is shown in FIGS. 2 and 3 with a single contact arm 30 projecting on opposite sides of nozzle body 12, valve pin 20 may comprise more than one contact arm and contact arm 30 may comprise more than two segments projecting beyond nozzle passage 14 so long as the arrangement of contact arms and contact pins are effective to produce offsetting torques on the valve pin from forces acting on the contact pins. Further, although contact arm 30 and valve pin 20 are shown as a unitary construction, contact arms may as well be individual elements joined to valve pin 20 so long as the contact arms are effective to transfer forces arising from closure of a mold assembly to translate valve pin 20 relative to valve body 12. In this regard it is also noted that in accordance with the unitary construction of contact arm 30 and valve pin 20 shown, assembly of nozzle 10 is facilitated by providing separate and attachable segments of nozzle body 12 such as forward section 11 and base section 13. Alternatively, a unitary nozzle body could be provided with transverse openings therein for the contact arm, were valve pin 20 and contact arm 30 provided as separate and attachable elements. Still further, although depicted in FIGS. 2 and 3 as passing through forward section 11 of valve body 12, contact pins 33 and 34 could as well be mounted to contact arm 30 so as to lie outside valve body 12. In such arrangements, guides for the otherwise unsupported ends of contact pins 33 and 34 could comprise the extremity of the forward section 11 proximate the nozzle outlet or an element of the mold assembly in which the nozzle 10 is mounted.

Continuing with reference to FIGS. 2 and 3, spring 36 is provided to bias valve pin 20 to its closed position shown in FIG. 3. One end of spring 36 abuts the projections of contact arm 30 beyond nozzle passage 14 and the other end of spring 36 abuts shoulder 44 on base section 13 of nozzle body 12. Nozzle body 12 is mounted so that on closure of a mold assembly, the free end of contact pins 33 and 34 will contact a surface (shown schematically in FIG. 3) as a result of relative motion between nozzle body 12 and the surface. Thereafter, continued relative motion of nozzle body 12 and the surface to reduce the distance therebetween will overcome the force of spring 36 to effect motion of contact pins 33 and 34, contact arm 30 and valve pin 20 relative to nozzle body 12 so as to separate valve end 28 from nozzle outlet 18. With the mold assembly fully closed, the distance between nozzle body 12 and the surface will be at a minimum and valve pin 20 will be located within nozzle passage 14 at an open position (not shown). The open position of valve pin 20 enables flow of melt through nozzle 10, melt flowing through pin passage 22 between nozzle inlet 16 and nozzle outlet 18. On opening of the mold assembly, the distance between nozzle body 12 and the surface increases and contact pins 33 and 34 are restored to the position shown in FIG. 3 by the force of spring 36 acting on contact arm 30. Hence, the spring functions as a biasing means to hold nozzle 10 closed, i.e. to hold valve pin 20 in a closed position whenever a force is not applied to contact arm 30 to overcome the spring force. Although illustrated as fitted externally to nozzle body 12, spring 36 could as well be contained within nozzle body 12. For example, spring 36 could be placed in a section of nozzle passage 14 of enlarged diameter, and advantageously, bypassed by the flow of melt conducted through pin passage 22.

FIG. 4 depicts an alternative construction of a nozzle in accordance with the invention. Elements of FIG. 4 corresponding to elements of FIG. 3 have the same reference numbers. Nozzle body 12 is fitted with nozzle tip 46 projecting from the forward section 11 of nozzle body 12 and having tip passage 48 therethrough connecting nozzle passage 14 with tip outlet 49. Tip outlet 49 comprises the nozzle outlet and, in correspondence with nozzle outlet 18 of FIG. 3, tip outlet 49 comprises a neck portion. Nozzle tip 46 is advantageously joined to nozzle body 12 by a threaded connection and includes a convex head projecting beyond the end face of nozzle body 12. Valve pin 20 is movably supported within nozzle passage 14 and, advantageously, sealing means such as ring seals 47a and 47b prevent melt bypassing valve pin 20 through nozzle passage 14. Valve end 28 of valve pin 20 is sized to form a seal with the neck portion of tip outlet 49. Nozzle body 12 is mounted so that on closure of a mold assembly, contact pins 33 and 34 contact a surface (shown schematically in FIG. 4) as a result of relative motion between nozzle body 12 and the surface. Thereafter, continued relative motion of nozzle body 12 and the surface to reduce the distance therebetween will overcome the force of spring 36 to effect motion of contact pins 33 and 34, contact arm 30 and valve pin 20 relative to nozzle body 12 so as to separate valve end 28 from tip outlet 49. With the mold assembly fully closed, the distance between nozzle body 12 and the surface will be at a minimum and valve pin 20 will be located in an open position (not shown). The open position of valve pin 20 enables flow of melt through nozzle 10, melt flowing through pin passage 22 between nozzle inlet 16 and tip outlet 49. On opening of the mold assembly, the distance between nozzle body 12 and the surface increases and contact pins 33 and 34 are restored to the position shown in FIG. 4 by the force of spring 36 acting on contact arm 30.

With reference to FIGS. 3 and 4, the convex head of nozzle tip 46 advantageously conforms to the concavity of nozzle outlet 18 (FIG. 3). Nozzles according to FIGS. 3 and 4 are advantageously used in pairs mounted in components of a mold assembly so that nozzle tip 46 and nozzle outlet 18 are opposed. On closure of the mold assembly, the convex head of nozzle tip 46 abuts in seating engagement against the concavity of nozzle outlet 18 and valve pins 20 are separated from, respectively, tip outlet 49 and nozzle outlet 18, whereby melt may be conducted through the opposed nozzles, melt flowing through pin passage 22 of each nozzle between the respective nozzle inlet and nozzle outlet, wherein melt is conveyed to a mold cavity. Upon opening of the mold assembly, springs 36 restore valve pins 20 to their closed positions, preventing flow of melt through the nozzles. Such an arrangement of nozzles is advantageously applied to a mold arrangement comprising plural mold assemblies (FIG. 1b) at the interfaces of sprue bar segments 98a and 98b, 100a and 100b, and 100c and 100d, whereby flow of melt is passively controlled at the interfaces of the sprue bar segments in accordance with the opening and closing of mold assemblies 72 and 74. As described with reference to FIG. 1b, the opening and closing of mold assemblies 70–74 is effected by movement of intermediate movable platens 92 and 94 and movable platen 90, respectively. Movement of intermediate movable platens 92 and 94 to open mold assemblies 70 and 72 will effect separation of mating sprue bar segments, separating the nozzles at the interfaces thereof. Movement of intermediate movable platens 92 and 94 to close mold assemblies 70 and 72 will effect abutment of sprue bar segments, achieving seating engagement of nozzles at the interfaces thereof. Contact pins 33 and 34 of nozzles so arranged at the interfaces of the sprue bar segments contact surfaces of the opposed nozzles, the separation and abutment of the sprue bare segments effecting movement of contact pins 34 relative to nozzle bodies 12 as herein described.

While each of the nozzles of FIGS. 3 and 4 are shown with contact pins 33 and 34 mounted directly to contact arm 30, linkages may be interposed between contact arm 30 and contact pins 33 and 34 without departing from the spirit or scope of the invention. Such arrangements allow placement of the contact pins 33 and 34 apart from contact arm 30 to accommodate constructions of components in which the nozzles are mounted. Further, while the valve pin biasing means is illustrated as spring 36 (shown as a helical spring in FIG. 2), other biasing means may be employed without departing from the spirit or scope of the invention. Still further, although not shown in the preferred embodiments replaceable sealing members may be provided on the periphery of the nozzle body as well as surrounding the inlet and outlet ends thereof without departing from the spirit and scope of the invention. Such sealing members being selected to accommodate differences of thermal expansion of the nozzle body and the component in which it is mounted. Other additions and substitutions of elements known to those skilled in the art may be applied to the nozzles and apparatus herein shown and described without departing form the spirit and scope of the invention as claimed.

What is claimed is:

1. A nozzle for controlling flow of melt through conduits of injection molding equipment, the nozzle comprising a nozzle body having a nozzle passage therethrough joining a nozzle inlet and a nozzle outlet, a valve pin movably supported within the nozzle passage and having a pin passage therethrough in communication with the nozzle passage and at least one contact arm transverse to and extending beyond the nozzle passage, sealing engagement of the valve pin and nozzle passage preventing melt bypassing the valve pin through the nozzle passage whereby melt is conducted through the pin passage between the nozzle inlet and the nozzle outlet, and a valve pin biasing means, the biasing means biasing the valve pin to a closed position for preventing passage of melt through the nozzle passage, the pin passage being in communication with the nozzle passage and the contact arm effecting movement of the valve pin relative to the nozzle body to an open position when forces acting on the contact arm are sufficient to overcome the biasing means, the open position enabling flow of melt through the nozzle body, the nozzle being mounted in the molding equipment so that the valve pin is displaced to the open position by forces applied to the contact arm as a result of closure of the mold assembly.

2. The nozzle according to claim 1 wherein the contact arm further comprises at least two contact pins extending beyond the nozzle outlet for engaging a surface, movement of the valve pin relative the nozzle body on closure of a mold assembly being effected by relative movement between the contact pins and the nozzle body in a direction opposed by the biasing means, the contact pins being arranged so as to produce offsetting torques acting on the valve pin as a result of forces applied to the contact pins.

3. The nozzle according to claim 1 further comprising at least one heater for maintaining melt within the nozzle in a flowable condition.

4. The nozzle according to claim 1 wherein the nozzle outlet comprises a neck portion and the valve pin further comprises a valve end for forming a seal with the neck portion of the nozzle outlet when the valve pin is in a closed position.

5. The nozzle according to claim 1 wherein the pin passage joins a pin inlet and pin outlet, each open to the nozzle passage, and the pin outlet comprises a plurality of pin ports effective to divide the flow of melt therethrough.

6. The nozzle according to claim 1 further comprising sealing means effective to prevent melt bypassing the valve pin through the nozzle passage and exiting the nozzle body around the contact arm.

7. The nozzle according to claim 1 wherein the biasing means comprises a spring engaging the contact arm.

8. The nozzle according to claim 1 further comprising a nozzle tip projecting from the nozzle body and having a tip passage therethrough, the tip passage connecting the nozzle passage and a tip outlet, the nozzle outlet comprising the tip outlet.

9. The nozzle according to claim 8 wherein the nozzle tip comprises a convex head projecting from the nozzle body.

10. The nozzle according to claim 9 wherein the tip outlet further comprises a neck portion and the valve pin further comprises a valve end for forming a seal with the neck portion of the tip outlet when the valve pin is in a closed position.

11. The nozzle according to claim 8 wherein the contact arm further comprises at least two contact pins extending beyond the nozzle outlet for engaging a surface, movement of the valve pin relative the nozzle body with closure of a mold assembly being effected by relative movement between the contact pins and the nozzle body in a direction opposed by the biasing means, the contact pins being arranged so as to produce offsetting torques acting on the valve pin as a result of forces applied to the contact pins.

12. An apparatus for controlling flow of melt through a mold arrangement comprising plural mold assemblies, the apparatus comprising at least one conduit for conveying melt from an injection unit to at least one mold assembly, the conduit comprising mating segments abutted with closure of the mold assemblies and separated with opening of the mold assemblies, at least one of the mating segments comprising a nozzle comprising: (i) a nozzle body having a nozzle passage therethrough joining a nozzle inlet and nozzle outlet; (ii) a valve pin movably supported within the nozzle passage and having a pin passage therethrough in communication with the nozzle passage and at least one contact arm transverse to and extending beyond the nozzle passage, sealing engagement of the valve pin and nozzle passage preventing melt bypassing the valve pin through the nozzle passage whereby melt is conducted through the pin passage between the nozzle inlet and the nozzle outlet; and (iii) a valve pin biasing means, the biasing means biasing the valve pin to a closed position for preventing passage of melt through the nozzle passage, and the contact arm effecting movement of the valve pin relative to the nozzle body to an open position when forces acting on the contact arm are sufficient to overcome the biasing means; the nozzles being mounted in the apparatus so that the valve pins are displaced to the open positions by forces applied to the contact arms as a result of closure of the mold assemblies whereby the open positions enable flow of melt through the nozzles.

13. The apparatus according to claim 12 wherein each mating segment comprises a nozzle and the nozzles are configured for seating engagement of the outlet ends thereof upon abutment of the mating segments.

14. The apparatus according to claim 13 wherein one of the nozzles of the mating segments comprises a nozzle tip comprising a convex head projecting beyond the nozzle body and the nozzle outlet of nozzle of the other mating segment comprises a concavity to which the convex head conforms.

15. The apparatus according to claim 12 wherein each contact arm further comprises a contact pin extending beyond the nozzle outlet for engaging a surface, movement of the valve pins relative the nozzle bodies on closure of the mold arrangement being effected by relative movement between each contact pin and the nozzle body from which its contact arm extends in a direction opposed by the biasing means.

16. The apparatus according to claim 12 wherein each nozzle outlet further comprises a neck portion and the valve pin further comprises a valve end for forming a seal with the neck portion of the nozzle outlet when the valve pin is in a closed position.

17. The apparatus according to claim 12 wherein each pin passage joins a pin inlet and pin outlet, each open to the nozzle passage, and the pin outlet comprises a plurality of pin ports effective to divide the flow of melt therethrough.

18. The apparatus according to claim 12 wherein at least one nozzle further comprises sealing means effective to prevent melt bypassing the valve pin through the nozzle passage and exiting the nozzle body around the contact arm.

19. The apparatus according to claim 12 wherein at least one nozzle further comprises at least one heater to maintain melt within the nozzle in a flowable condition.

* * * * *